United States Patent [19]

Stensson et al.

[11] Patent Number: 4,497,392
[45] Date of Patent: Feb. 5, 1985

[54] RAIL VEHICLE DISC BRAKE CALIPER

[75] Inventors: Bo G. Stensson, Brösarp; Lars M. Severinsson, Hishult; Bo Lundström, Helsingborg, all of Sweden

[73] Assignee: SAB Nife AB, Landskrona, Sweden

[21] Appl. No.: 480,108

[22] Filed: Mar. 29, 1983

[30] Foreign Application Priority Data

Apr. 5, 1982 [SE] Sweden .................. 8202163

[51] Int. Cl.³ .............................. B61H 5/00
[52] U.S. Cl. ........................ 188/59; 188/71.8; 188/72.6
[58] Field of Search ............ 188/72.6, 59, 58, 79.5 K, 188/71.8, 71.9, 72.2, 72.7-72.9, 73.31, 73.41, 26, 71.1, 24.12, 24.15, 18 A, 24.19, 24.14, 42-45, 153 R, 107, 106 F, 196 M, 196 V, 197-203, 205 R

[56] References Cited

U.S. PATENT DOCUMENTS

| 3,189,128 | 6/1965 | Herbert | 188/72.6 X |
| 3,334,707 | 8/1967 | Eaton | 188/59 |
| 3,628,635 | 12/1971 | Yoshigai | 188/24.19 X |
| 4,022,300 | 5/1977 | Afanador et al. | 188/79.5 K X |
| 4,234,064 | 11/1980 | Tregoning | 188/79.5 K X |

FOREIGN PATENT DOCUMENTS 1960066 6/1971 Fed. Rep. of Germany .

Primary Examiner—Douglas C. Butler
Attorney, Agent, or Firm—Laurence R. Brown

[57] ABSTRACT

A rail vehicle disc brake caliper has a base frame (1) with a pivotally attached brake lever (3). Brake pads are provided on these parts in the vicinity of a disc to be braked. A brake cylinder (16) for acting on the brake lever is attached to the base frame. In order to obtain a space saving, simple and sturdy design with a required internal leverage and with a slack adjusting function a slack adjuster (15) of the rotary, lever type is arranged with its rotary part on a shaft (14) pivotally arranged in the base frame and its free arm connected to the piston rod (16') of the brake cylinder (16). This shaft is provided with a cam (17), preferably connected to the brake lever (3) by way of connecting links (18).

4 Claims, 3 Drawing Figures

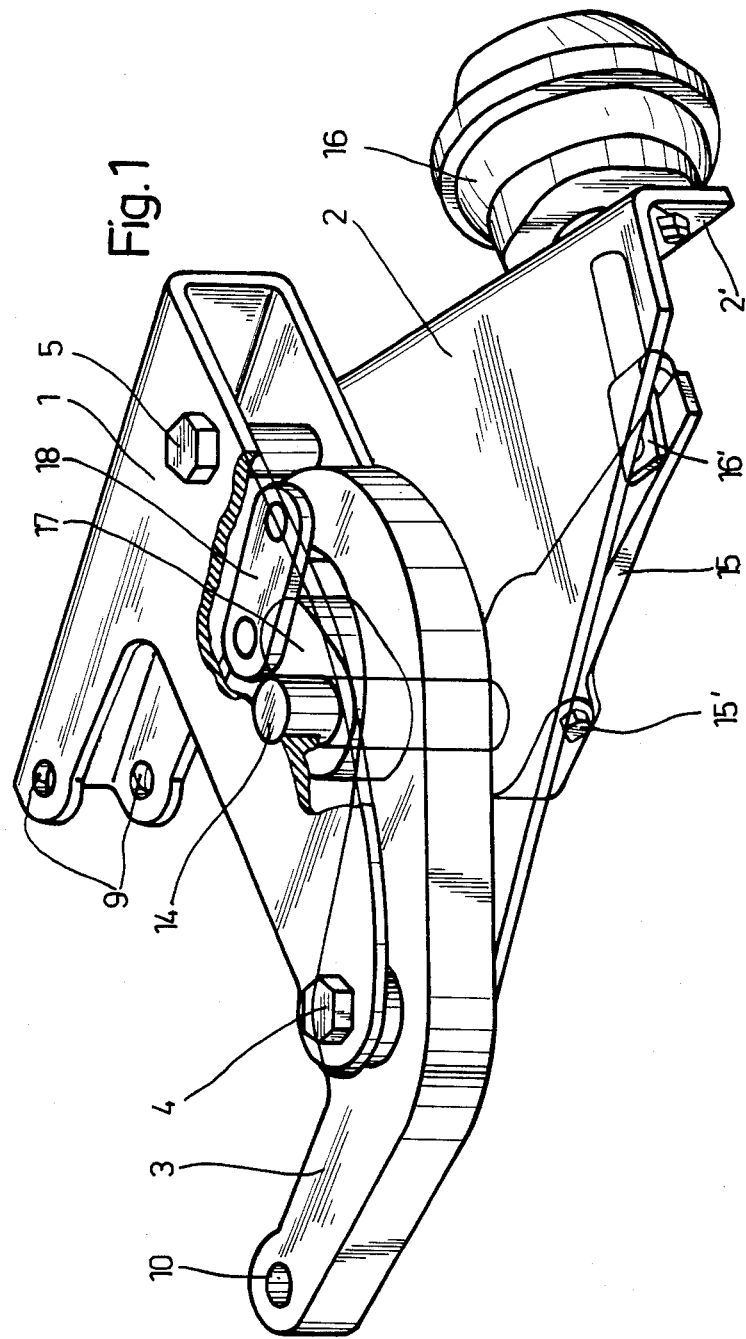

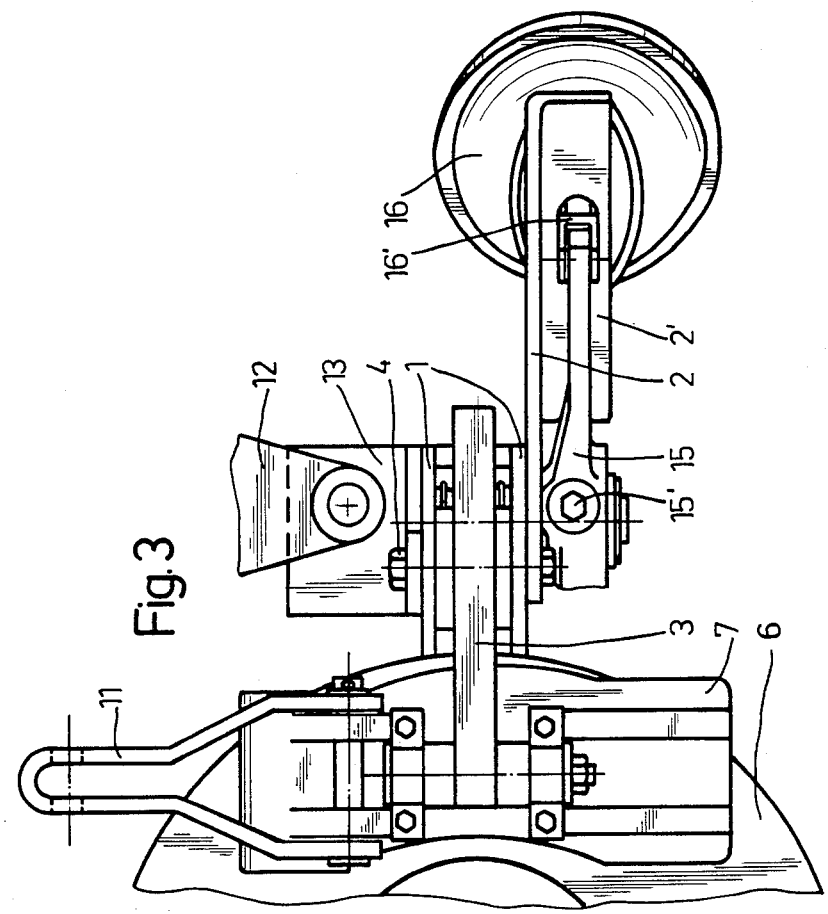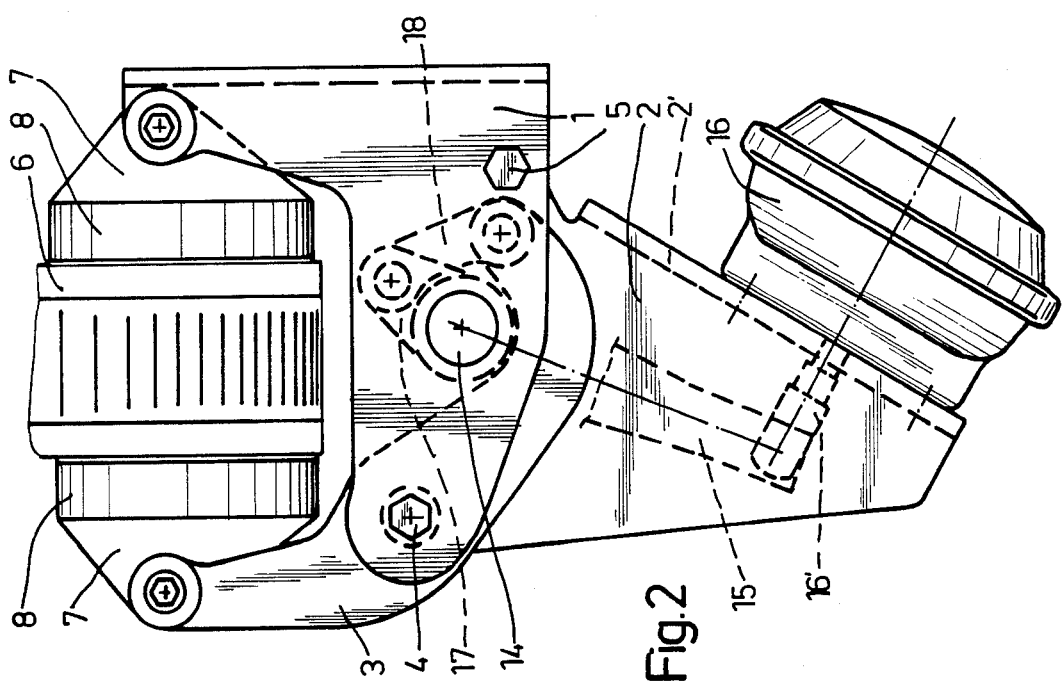

RAIL VEHICLE DISC BRAKE CALIPER

TECHNICAL FIELD

This invention relates to a rail vehicle disc brake caliper, which includes a base frame with a pivotally attached brake lever and is to be suspended from an underframe or bogie of the vehicle, the end portions of the base frame and the brake lever, respectively, on either side of a disc to be braked being provided with brake pads on pad holders and a fluid operated brake cylinder, which acts on the brake lever, being attached to the base frame.

BACKGROUND ART

A typical example of a disc brake caliper of this type is shown in U.S. Pat. No. 3,189,128. Such a disc brake caliper suffers from two main disadvantages: the leverage of the pivotable brake lever is in many cases too small, and it does not include any slack adjuster. If the leverage is increased without any other measures being taken, the space requirement will easily be too great, which also is true if the brake cylinder diameter is increased in order to obtain the higher brake force needed. Also, in this type of caliper it is difficult to build in the nowadays required slack adjuster without unduly increasing the volume of the arrangement.

It has to be noted that the space available for a disc brake arrangement in the vicinity of the disc or wheel to be braked most often is extremely limited in modern designs, whih of course makes the volume of the arrangement critical, but at the same time the brake force has to be high enough.

THE INVENTION

The somewhat contradictory requirements may be fulfilled and a conventional disc brake caliper of the type defined above may be improved in that, according to the invention, a slack adjuster of the rotary, lever type is arranged with its rotary part on a shaft pivotally arranged in the base frame and its free arm connected to the piston rod of the brake cylinder, the shaft being provided with a cam, which is force-transmittingly connected to the brake lever.

A slack adjuster of this type is well known in the art and is normally used as a force-transmitting and slack adjusting means in automotive brake systems of the S-cam type frequently used for heavy vehicles, such as trucks and buses. Such slack adjusters were earlier manual but are nowadays more often automatic; both types are possible in the present case, but the automatic one is preferred.

Slack adjusters of this type have also earlier been used for railway disc brake purposes, a typical example thereof being shown in German Pat. No. 1 960 066. More recently an automatic slack adjuster of the type in question specially adapted for railway purposes has been designed; such an adjuster is shown in U.S. Pat. No. 4,234,064 and may be used in the present disc brake arrangement.

It is obvious that a slack adjuster of the rotary, lever type fulfills the two requirements of obtaining an increased leverage and the slack adjusting function. Besides, an extremely compact disc brake caliper is attained. Due to the fact that slack adusters of this type are produced in large quantities for the demanding automotive industry, a cheap and reliable design may be obtained.

It is stated above that the "rotary part" of the slack adjuster is arranged on a pivoting shaft. This "rotary part" in an automotive slack adjuster of the type in question is normally a worm wheel; it may however equally well, depending on the design, be any foce-delivering part, which performs its slack adjusting function by small rotational movement relative to the lever itself.

Preferably the design has to be simple and sturdy, and sensitive parts shall be protected from the harsh environment as much as possible. This is according to the invention obtained in that the base frame comprises two connected plates, the cam and the brake lever being arranged between these two plates, and in that a bracket is attached to the base frame, the brake cylinder being attached to a flange of this bracket and the slack adjuster being protected thereby.

It is important to obtain the required leverage between the slack adjuster and the brake lever but also—and perhaps even more important—to minimize the variations in the leverage at different degrees of wear of the brake pads and under different conditions. In this respect it is advantageous if the brake lever extends past and partly around the shaft and is actuated by the cam at the side of the shaft generally facing from the pivot point of the brake lever in the base frame.

It would be possible to allow the cam to act directly on the end of the brake lever, but a better solution from different points of view is obtained in that the brake lever and the cam are connected by means of connecting links, pivotally attached to the respective parts.

BRIEF DESCRIPTION OF THE DRAWINGS

The invention will be described in further detail below reference being made to the accompanying drawings, in which FIG. 1 is a perspective and partly cut-away view of a disc brake caliper according to the invention, FIG. 2 is a top view of the same caliper with associated brake pads cooperating with a brake disc, and FIG. 3 is a side view of the same caliper to a somewhat reduced scale with a brake pad holder and with suspension means.

DETAILED DESCRIPTION OF A PREFERRED EMBODIMENT

As most clearly illustrated in FIG. 1, but also in FIGS. 2 and 3, a disc brake caliper according to the invention includes as main parts a generally U-shaped base frame 1, a bracket 2 attached to the base frame, and a brake lever 3 pivotally connected to the base frame by means of a pivot 4. This pivot 4 in the form of a screw joint also attaches the bracket 2 to the base frame 1 together with a screw joint 5.

This caliper is intended for suspension from a rail vehicle underframe or bogie (for example by means described below and shown in FIG. 3) in the vicinity of a brake disc 6, which is mounted on a wheel axle of the vehicle in a way known per se. With minor modifications of the caliper it may quite as well be intended for cooperation with wheel-mounted brake discs.

The free end portions of the base frame 1 and the brake lever 3, respectively, are provided with a pad holder 7 having a replaceable brake pad 8. In the shown case the two pad holders 7 are pivotally mounted in holes 9 in the base frame 1 and a hole 10 in the brake lever 3. As a modification, however, the pad holder 7 at the base frame 1 may be fixedly attached thereto.

For the purpose of suspending the caliper each pad holder 7 is provided with a suspension link 11 (FIG. 3), whereas a central suspension bracket 12 is movably attached to an attachment 13 held to the base frame 1 by means of the screw joints 4 and 5. It is to be noted that these suspension means are only examples of different possible solutions and that the invention is only concerned with the caliper itself.

The base frame 1 is provided with a substantially centrally located pivot shaft 14, which is journalled in the two plates of the U-shaped base frame 1 and has a splined end extending out from the lower side of the base frame past the bracket 2.

On this splined shaft end is mounted an automatic slack adjuster 15, which is well known in the automotive brake art and is normally used as a brake force-transmitting and slack adjusting lever in an S-cam drum brake system for heavy road vehicles, such as trucks and buses.

For the proper understanding of the invention and the function of the disc brake caliper it is not necessary to have any specific knowledge about the design of the slack adjuster used. Accordingly no description thereof is given here. The slack adjuster can be defined as being of the rotary, lever type, as the slack adjusting function results in a small rotary motion of a splined worm wheel of the adjuster and thus in this case of the pivot shaft 14.

A pneumatic brake cylinder 16 is attached to a reinforcing flange 2' of the bracket 2, and its outgoing push rod 16' is connected to the end of the slack adjuster 15, as can be seen in FIG. 3.

The pivot shaft 14 is provided with a small fixed arm or radial cam 17 between the two plates of the base frame 1. This cam 17 extends towards the brake disc 6 in the initial position with new brake pads 8 in the caliper. When the pads are worn out, the arm 17 may have performed a turning or rotation of 90° in the clockwise direction, as viewed in FIG. 2, due to the slack adjusting function of the slack adjuster 15.

As appears, the brake lever 3 extends past and partly around the pivot shaft 14 and is connected to the cam 17 by means of connecting links 18.

At the admission of air under pressure to the brake cylinder 16 the pivot shaft 14 will be turned in the clock-wise direction by the slack adjuster 15 mounted thereon, and the cam 17 will push the brake lever 3 downwards, as viewed in FIG. 2, via the connecting links 18, so that the brake lever 3—pivoting about the axis 4—will apply the brake pad 8 against the brake disc 6, in which case the different parts of the caliper may have the position shown in FIG. 1.

The ratio between the effective lengths of the slack adjuster 15 and the cam 17 multiplied by the ratio between the effective lengths of the two arms of the brake lever 3 is the total ratio or leverage in the shown caliper. This total ratio may be considerable and is in the order of 4.5 with the shown geometry, whereas a direct connection of the brake lever 3 to the piston rod 16' of the brake cylinder 16 would have given a ratio in the order of 1.5 with otherwise unchanged geometry.

It is important to minimize the fluctuations in the ratio depending on the shifts in geometry during on the one hand one brake application, on the other hand different brake applications with different degree of wear of the brake pads 8. Such a minimizing is obtained by the shown geometry, especially at the cam 17 connected to the brake lever 3. A special difficulty in this respect is that when the brake pads 8 are gradually worn, the slack adjuster 15 will turn the shaft 14 in the clockwise direction (up to 90°) and thus move the initial position of the cam 17 further and further down as viewed in FIG. 2.

When the brake pads 8 have to be replaced after having been worn out, the original position of the cam 17 may be restored by manual rotation of a reset nut 15' on the slack adjuster 15.

Modifications are possible within the scope of the appended claims. Although the automatic slack adjuster 15 is manufactured at comparatively low cost and may be regarded as a well functioning machine element, it may be replaced by a manual slack adjuster of the type more commonly used earlier in the automotive industry or even by a simple arm, if the slack adjusting function is not required at all.

Another modification would be to alter the means for transmitting the forces between the arm 17 and the brake lever 3. A cam arrangement replacing the connecting links 18 would be feasible, although it would be difficult to obviate excessive leverage fluctuations.

The pivot shaft 14 is said to be "centrally located" but may—as a further modification—have another location in the base frame 1, which also instead of being U-shaped can consist of two connected plates or have a similar design.

We claim:

1. A rail vehicle disc brake caliper arrangement for actuating a braking disc on the rail vehicle comprising in combination, a brake caliper including a base frame having a pivotally attached caliper lever extending therefrom to operate in a caliper plane and adapted to carry brake pads on opposite sides of said braking disc, a slack adjuster with a worm wheel for positioning a rotatable shaft thereof pivotally arranged in the base frame adjusting differences of slack during brake pad wear by small relative rotary movements of the worm wheel and shaft and having an actuating lever arm disposed to rotate said shaft, means mounting said slack adjuster in said frame with said lever arm disposed to move in a plane substantially parallel to the caliper plane, means connecting a fluid actuated brake cylinder to rotate the slack adjuster actuating lever arm for braking, and coupling means coupling the slack adjuster rotatable shaft to pivot said caliper lever in response to both the brake cylinder braking and the slack adjuster adjustments.

2. A caliper arrangement according to claim 1 in that the base frame comprises two connected substantially parallel plates forming a fixed caliper arm, means for pivoting the pivotally attached caliper lever between said plates, and wherein said coupling means includes a rotatable cam affixed to the slack adjuster rotatable shaft mounted between said plates.

3. A caliper arrangement according to claim 2 further comprising, structure between the plates affixed to move with said caliper lever and partly surrounding said rotatable slack adjuster shaft and extending around the shaft to terminate in and end position opposite to the means for pivoting the caliper lever in the base frame, and wherein said coupling means comprises a coupling member pivotally attached between the end position of the caliper lever to the rotatable cam.

4. A caliper arrangement as defined in claim 2 including a bracket affixed to one of said plates and extending therefrom, and means mounting said fluid actuated brake cylinder on said bracket for rotation of said rotary lever of the slack adjuster.

* * * * *